United States Patent
Bieringer et al.

(10) Patent No.: US 9,406,434 B2
(45) Date of Patent: Aug. 2, 2016

(54) DISTRIBUTION TRANSFORMER FOR VOLTAGE REGULATION OF LOCAL DISTRIBUTION NETWORKS

(71) Applicants: Alfred Bieringer, Geiselhoering (DE); Christian Hammer, Regensburg (DE); Martin Pankofer, Plattling (DE); Rolf Strempel, Regensburg (DE); Andreas Stocker, Neutraubling (DE)

(72) Inventors: Alfred Bieringer, Geiselhoering (DE); Christian Hammer, Regensburg (DE); Martin Pankofer, Plattling (DE); Rolf Strempel, Regensburg (DE); Andreas Stocker, Neutraubling (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 128 days.

(21) Appl. No.: 14/379,955

(22) PCT Filed: Mar. 25, 2013

(86) PCT No.: PCT/EP2013/056219
§ 371 (c)(1),
(2) Date: Aug. 21, 2014

(87) PCT Pub. No.: WO2013/156261
PCT Pub. Date: Oct. 24, 2013

(65) Prior Publication Data
US 2015/0028978 A1   Jan. 29, 2015

(30) Foreign Application Priority Data
Apr. 20, 2012   (DE) .................. 10 2012 103 490

(51) Int. Cl.
*H01F 21/12*   (2006.01)
*G05F 1/14*   (2006.01)
(Continued)

(52) U.S. Cl.
CPC ............. *H01F 29/04* (2013.01); *H01H 9/0011* (2013.01); *H01H 9/0016* (2013.01);
(Continued)

(58) Field of Classification Search
CPC .. H01F 29/04; H01H 33/6661; H01H 9/0011; H01H 9/0016; H01H 9/0027; H01H 2033/6667; H02P 13/06
USPC .......... 336/150; 323/250–251, 255–256, 264; 200/11 TC
See application file for complete search history.

(56) References Cited

U.S. PATENT DOCUMENTS 3,581,188 A  *  5/1971  Watanabe ............... H01F 27/40
                                                 323/340
3,614,597 A  *  10/1971  Van Riemsdijk .... H01H 9/0005
                                                 200/11 TC (Continued)

FOREIGN PATENT DOCUMENTS

DE        19847745 B     1/2000
DE        19855860 B     2/2000
(Continued)

OTHER PUBLICATIONS

Power Distribution, Intelligente Systemloesungen fuer Verteilnetze, Smart Grid Loesungen, 8 pages, Germany.

*Primary Examiner* — Mangtin Lian
*Assistant Examiner* — Kazi Hossain
(74) *Attorney, Agent, or Firm* — Andrew Wilford

(57) ABSTRACT

The invention relates to a distribution transformer having a tap-changing device for no-break switching between different winding taps of a distribution transformer. The general inventive concept consists in actuating both the selector contact unit and the switching means for no-break load switching by means of a common motor drive without interposition of an energy store.

18 Claims, 13 Drawing Sheets

(51) Int. Cl.

| | | |
|---|---|---|
| *H01H 21/00* | (2006.01) | |
| *G05F 1/325* | (2006.01) | |
| *G05F 1/33* | (2006.01) | |
| *G05F 1/12* | (2006.01) | |
| *H01F 29/04* | (2006.01) | |
| *H01H 9/00* | (2006.01) | |
| *H01H 33/666* | (2006.01) | |
| *H02P 13/06* | (2006.01) | |

(52) U.S. Cl.
 CPC .......... *H01H 9/0027* (2013.01); *H01H 9/0038* (2013.01); *H01H 33/6661* (2013.01); *H02P 13/06* (2013.01); *H01H 9/0044* (2013.01); *H01H 2033/6667* (2013.01)

(56) References Cited

U.S. PATENT DOCUMENTS

| | | | | |
|---|---|---|---|---|
| 3,643,154 | A * | 2/1972 | Van Riemsdijk | H01H 9/0005 200/11 TC |
| 3,662,253 | A * | 5/1972 | Yamamoto | H01F 29/04 323/343 |
| 3,720,867 | A * | 3/1973 | Rathbun | H01F 27/402 218/118 |
| 3,743,921 | A * | 7/1973 | Legg | G05F 1/20 315/219 |
| 3,824,355 | A * | 7/1974 | Norman | H01H 1/42 200/16 C |
| 4,081,741 | A * | 3/1978 | Palmer | H01H 9/0005 323/340 |
| 5,523,674 | A * | 6/1996 | Dohnal | H01H 9/0038 200/11 TC |
| 7,145,760 | B2 | 12/2006 | Stenestam | |
| 7,463,010 | B2 | 12/2008 | Dohnal | |
| 8,013,702 | B2 | 9/2011 | Haj-Maharsi | |
| 8,648,587 | B2 | 2/2014 | Brueckl | |
| 2004/0032699 | A1 * | 2/2004 | Dohnal | H01F 29/025 361/38 |
| 2012/0139510 | A1 | 6/2012 | Wrede | |
| 2012/0249277 | A1 * | 10/2012 | Kraemer | H01F 29/04 336/145 |

FOREIGN PATENT DOCUMENTS

| | | |
|---|---|---|
| DE | 102008064487 A | 6/2010 |
| GB | 2614794 A | 8/1979 |
| JP | S59204224 B | 11/1984 |

\* cited by examiner

DISTRIBUTION TRANSFORMER FOR VOLTAGE REGULATION OF LOCAL DISTRIBUTION NETWORKS

CROSS REFERENCE TO RELATED APPLICATIONS

This application is the US-national stage of PCT application PCT/EP2013/056219 filed 25 Mar. 2013 and claiming the priority of German patent application 102012103490.7 itself filed 20 Apr. 2012.

The invention relates to a distributing transformer for voltage regulation of local mains. Such distributing transformers are frequently also termed local mains transformers in expert literature.

Classically, voltage regulation in distributing systems takes place already in the medium-voltage level. Due to increasing establishment of regenerative energy generation possibilities, substantially changed conditions arise at the low-voltage level that is close to the consumer. On the one hand it has to be realized that due to the feed of regenerative energies to points close to the consumer the power flows in the electrical mains change their direction depending on the respective feed situation, i.e. depending on whether more electrical energy is extracted or is regeneratively supplied. It is thus possible that energy is as a result now also fed back into higher mains levels. On the other hand, the regenerative feed of energy takes place in weather-dependent manner, particularly in dependence on wind conditions and level of sunshine, often very transiently and to a substantially changing extent. It is thus necessary to overall take into account increased and transient voltage fluctuations, not known previously, in the low-voltage mains.

In previous typical mains, use was made of distributing transformers, which operate with a fixed translation ratio, for coupling of the medium-voltage and low-voltage levels. Compensation for the described transient voltage fluctuations, which are very substantial in height and that previously were not noted since at the time regenerative energy supply was not carried out, could not and cannot be made by such unregulated distributing transformers. As a consequence, it is now the situation with such conventional mains that the necessary voltage quality can no longer be ensured; it is thus necessary and increasingly important to also provide regulable distributing transformers in the low-voltage level.

These interrelationships are explained in the publication 'Intelligente Systemlosungen für Verteilnetze', Maschinenfabrik Reinhausen GmbH, printing June 2011. Moreover, two technical possibilities for regulation of—hitherto unregulated—distributing transformers are described in this publication:

On the one hand classical regulation by a tap changer in oil-switching technology. Such tap changers are marketed by, for example, the applicant under the designation OILTAP (Registered Trade Mark).

On the other hand, so-called hybrid actuators are available, i.e. tap changers having not only mechanical contacts, but also semiconductor switches.

Distributing transformers, which for that purpose obviously have to have a tapped regulating winding with winding taps on one side, preferably the low-voltage side, can be regulated by both forms of embodiment.

DE 10 2008 064 487 describes a further form of construction of a regulable distributing transformer of that kind, wherein a connected step switching device is based on one or more mechanical switches. Only when switching from one winding tap to another takes place is the current temporarily conducted via semiconductor switching elements so as to ensure freedom from interruption. This is thus equally a hybrid switching device, i.e. a combination of mechanical and semiconductor switching technology.

A further form of embodiment of a regulable distributing transformer is known from DE 10 2009 014 243 [US 2003/0139510], wherein here by means of a switching matrix of power semiconductors the windings of the primary side can be short-circuited or can be acted on by same-phase or opposite-phase voltage through rapid switching. In that case, the output voltage remains free of interruption during the switching processes.

Finally, WO 2010/144805 [U.S. Pat. No. 8,013,702] describes yet another regulable distributing transformer that operates exclusively with semiconductor switching elements for the switching. In that case, the semiconductor switching elements and the complete solid state tap changer are arranged in a special region of pocket-like construction at the upper side of the distributing transformer.

Each of these concepts has specific advantages and disadvantages. In the case of constructions with semiconductor components it is to be noted that these are relatively temperature-sensitive and, in addition, as a general rule cannot be arranged directly in the insulating oil of the distributing transformer. The constructional cost in the case of distributing transformers of that kind is thereby increased.

It is the object of the invention to indicate a solution for a regulable distributing transformer that has resort to the vacuum technology proven in tap changers, i.e. makes use of vacuum interrupters as switching elements or actuators for switching between the different winding taps on the side, which is to be regulated, of the distributing transformer.

Vacuum interrupters of that kind have proved themselves for many years in the tap changers offered by the applicant, particularly of the types VACUTAP (Registered Trade Mark) VV (Registered Trade Mark), VACUTAP (Registered Trade Mark) VR (Registered Trade Mark) and VACUTAP (Registered Trade Mark) VM (Registered Trade Mark). However, due to their mode of construction and due to the large-volume insulating cylinder, which receives the actual tap changer, used they are not suitable for employment in distributing transformers for reasons of space. For functional reasons known tap changers of that kind according to vacuum technology, even those of other manufacturers, cannot be reduced in size in simple manner so that they would suitable for distributing transformers. Reduction in size founders on the fact inter alia that the known tap changers of relevant category with vacuum interrupters without exception have a force-storing device with a draw-up part and a drive output part, in which the draw-up part is drawn up by a continuously rotating drive shaft and the drive output part after drawing up to maximum extent has been achieved is released and abruptly effects the actual load changeover.

The set object is fulfilled by a regulable distributing transformer with the features of the first claim. The subclaims relate to particularly advantageous developments of the invention.

The general inventive idea consists of providing a regulable distributing transformer with a step regulating device in which not only the selector contact unit, but also the switching means for the uninterrupted load switching are actuatable by means of a common motor drive without interposition of a force-storing device. Due to the fact that the distributing transformer according to the invention dispenses with a force-storing device in the step regulating device it is compact in its mode of construction to such an extent that vacuum interrupters proven in classical tap changers can now also find use in distributing transformers.

According to a preferred form of embodiment this is achieved in that rotation produced by a motor drive is transferred by means of a transmission module to a threaded spindle disposed in engagement with a spindle nut, which is provided at a center slide carriage, so that a longitudinal displacement of the middle slide carriage along guide rods can thereby be produced, whereas the remaining slide carriages are disposed in operative connection with the middle slide carriage by way of a similarly longitudinal displaceable guide link, which is arranged at the second side of a support plate and that is mechanically coupled with the middle slide carriage, so that the remaining slide carriages are in turn mechanically coupled with the middle slide carriage by way of the guide link in such a manner that not only the selector contact unit, but also the switching means for the uninterrupted load switching-over are thereby simultaneously actuatable. Thus, actuation of the vacuum interrupters is directly derived from the linear movement of the selector contact unit.

According to a further preferred form of embodiment of the invention the distributing transformer comprises a transmission module that is fastened to the underside of the transformer cover and that co-operates with the motor drive arranged at the opposite outer side of the transformer cover. The transmission module has, for that purpose, a flange-like sealing module that is arranged directly at the underside of the transformer cover and that is detachably connected, in particular screw-connected, with the motor drive. In addition, the entire load changeover switch is fastened to the transmission module. The transmission module thus has not only the task of mounting the tap regulating device, but also the task of sealing relative to the outer side of the transformer by means of the sealing module.

According to a further preferred form of embodiment of the invention a support plate of a dielectric material, particularly a plastics material, is provided, at which the selector contact unit is arranged on a first side and the switching means for uninterrupted switching-over on a second side in such a manner that the support plate produces the spacing from ground necessary for the on-load tap changer.

According to yet a further form of embodiment of the invention the at least one selector contact unit during switching-over is moved along two substantially parallel arranged guide rods that ensure linear guidance of the at least one selector contact unit and that are mounted by a plurality of cross members arranged at the support plate. A selector contact unit in that case comprises at least one respective slide carriage as well as a contact support for receiving the movable selector contacts that co-operate with the fixed selector contacts.

According to yet a further form of embodiment of the invention the movable selector contacts are respectively received in a contact support and co-operate with fixed selector contacts that are arranged at the support plate, in such a manner that the individual fixed selector contacts are connectable by a longitudinal displacement of the movable selector contacts inclusive of the slide carriages, thus the selector contact unit, along the guide rod. By virtue of the movement of the selector contact unit to and/or fro the individual fixed selector contacts are connected and thus run through the regulating range of the on-load tap changer. The plurality of cross members, on which the guide rods are mounted, in particularly simple manner forms a mechanical abutment for the movable selector contacts displaceable longitudinally, so that the regulating range is thereby also mechanically limited.

According to yet a further preferred form of embodiment the switching means for the uninterrupted switching are directly arranged on the respective slide carriage of the corresponding selector contact unit. In this form of embodiment as well the switching means for the uninterrupted switching, as also the selector contact unit, are operated by a common motor drive without interposition of a force-storing device, in that the motor drive drives, by means of a diverter transmission, a central threaded spindle that in turn again converts the rotation into a longitudinal displacement of the slide carriages in such a manner that as a result not only the movable selector contacts, but also the switching means—that are arranged at the selector contact unit—for the uninterrupted switching of the tap regulating device of the distributing transformer are actuatable.

According yet a further preferred form of embodiment of the invention not only a threaded spindle that for its part is operatively connected with the selector contact unit, but also a camshaft, by means of which the switching means for the uninterrupted switching are actuatable, are driven by the motor drive. This makes possible in particularly advantageous manner a simple independent actuation of the selector contact unit by the switching means for the uninterrupted switching of the tap regulating device of the distributing transformer.

The invention and the advantages thereof are described in more detail in the following with reference to the accompanying drawings, in which:

FIG. 6b shows a detail view of the side perspective view according to FIG. 6a;

FIG. 7b shows a second side perspective view of the further form of embodiment according to FIG. 7a.

Figure 1A:
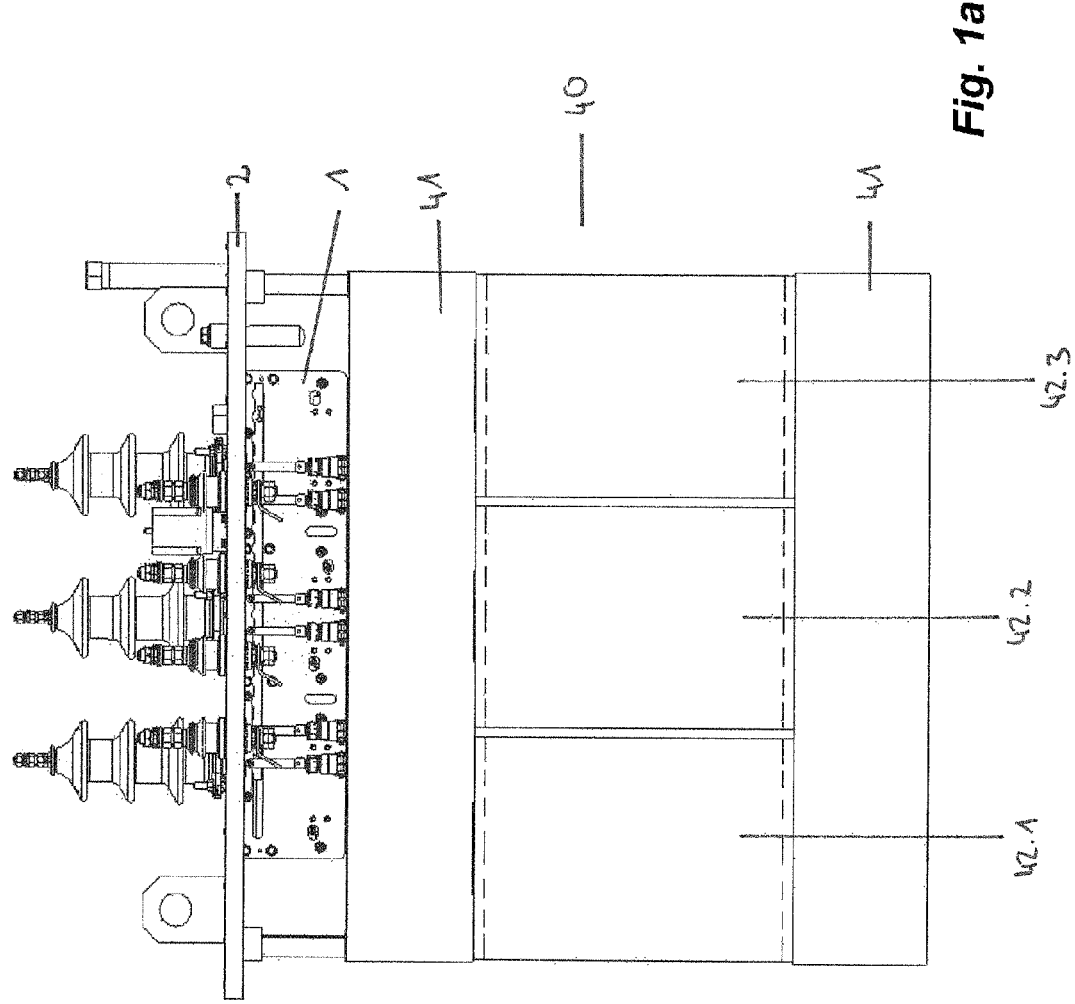
FIG. 1a shows a schematic illustration of a distributing transformer according to the invention with a step regulating device.
Figure 1B:
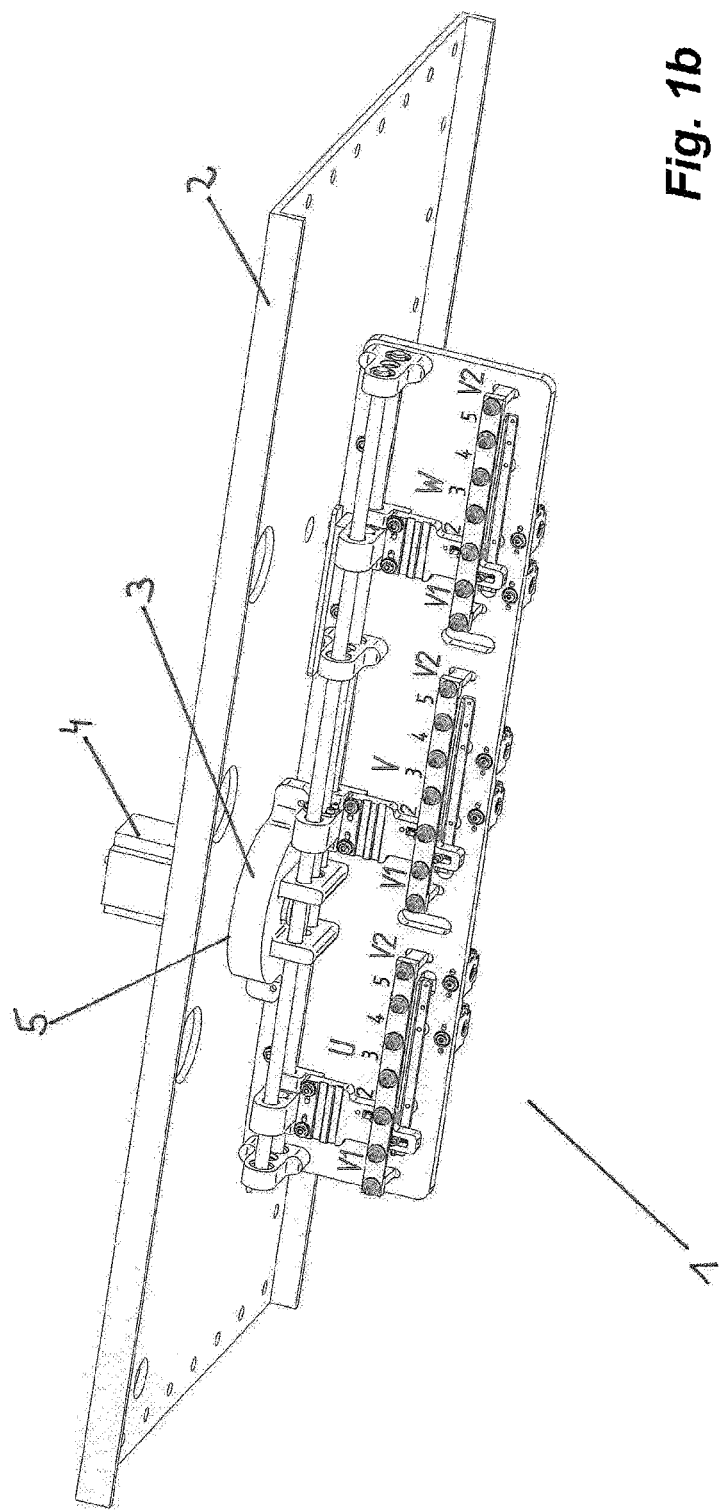
FIG. 1b shows a schematic perspective view of the distributing transformer according to the invention.
Figure 1C:
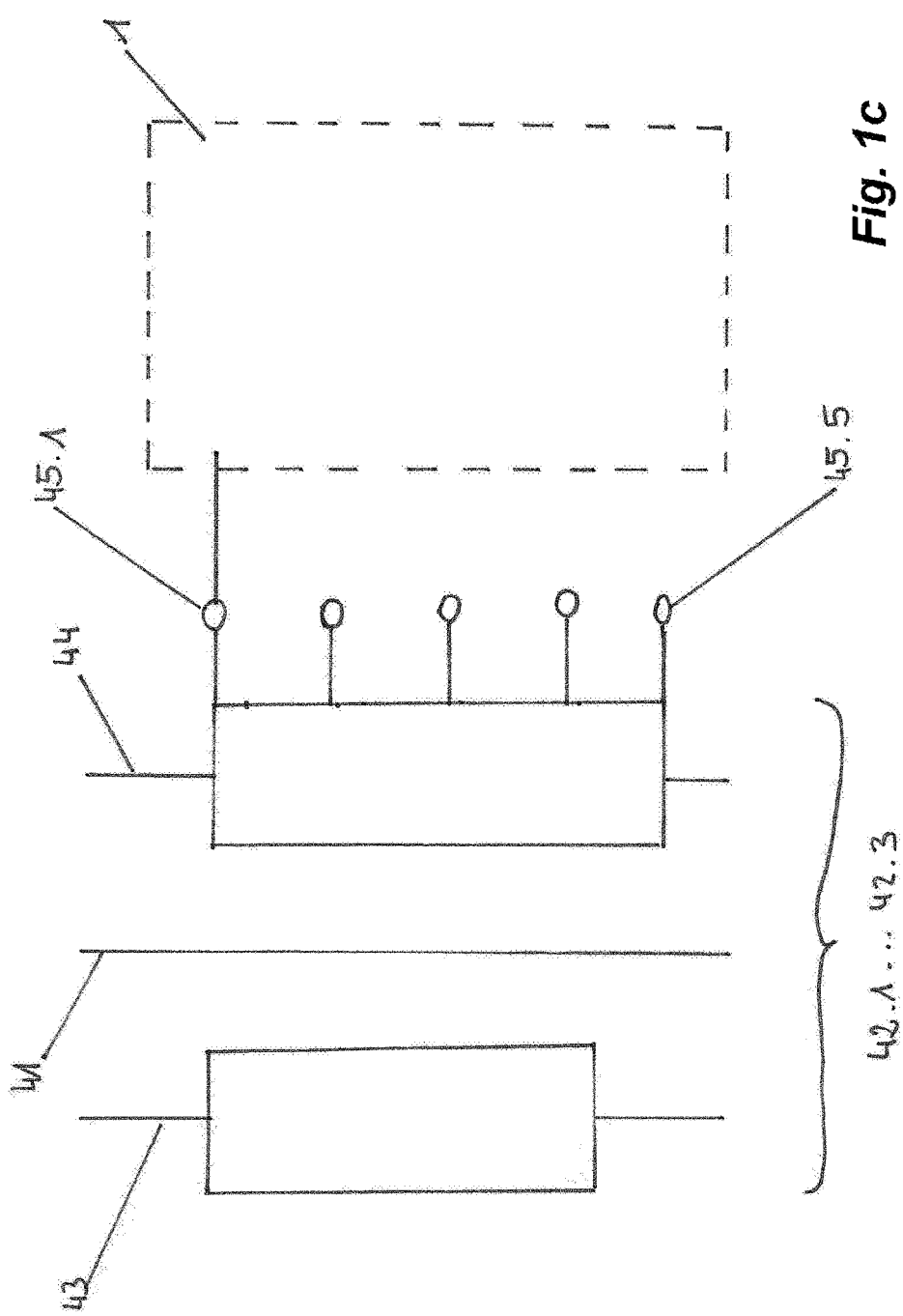
FIG. 1c shows a schematic flow chart of a distributing transformer according to the invention with a step regulating device.

A step regulating device 1 in co-operation with a distributing transformer 40 according to the invention, which is arranged directly below a transformer cover 2 of the distributing transformer 40, is shown in FIGS. 1a, 1b and 1c. A regulable distributing transformer 40 of that kind comprises a transformer vessel that is filled with insulating oil and in which at least one winding 42.1 . . . 42.3 is arranged at an iron yoke 41. This winding 42.1 . . . 42.3 is divided in the case of a regulable distributing transformer 40 into a main winding 43 and a regulating winding 44, at which a plurality of winding taps 45.1 . . . 45.3 forming the regulating range is provided. In addition, the step regulating device 1 is arranged at the regulating winding 44. The step regulating device 1 comprises a transmission module 3 that is attached to the underside of the transformer cover 2 and that co-operates with a motor drive 4 arranged at the opposite, outer side of the transformer cover 2. The motor drive 4 can in that case be constructed as, for example, a proprietary step motor. The transmission module 3 comprises a flange-like sealing module 5 that is arranged directly at the underside of the transformer cover 2 and detachably connected, in particular screw-connected, with the motor drive 4. The entire step regulating device 1 is thus fastened to the transmission module 3. The transmission module 3 fulfils not only the task of mounting the step regulating device 1, but also the task of hermetically sealing relative to the outer side of the distributing transformer by means of the sealing module 5.

Figure 2A:
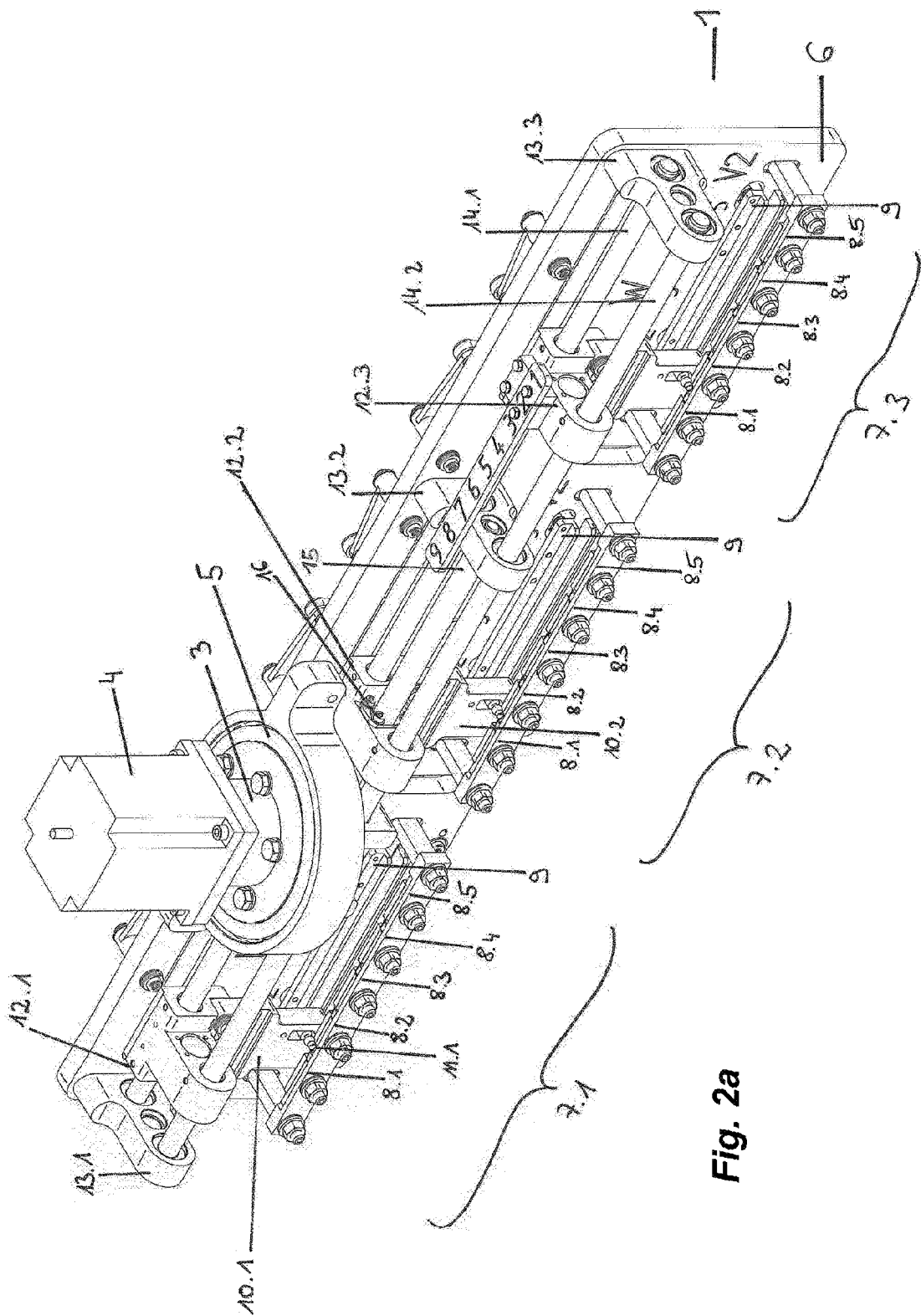
FIG. 2a shows a first side perspective view of the distributing transformer according to FIG. 1, at which the selector contacts are arranged.
Figure 2B:
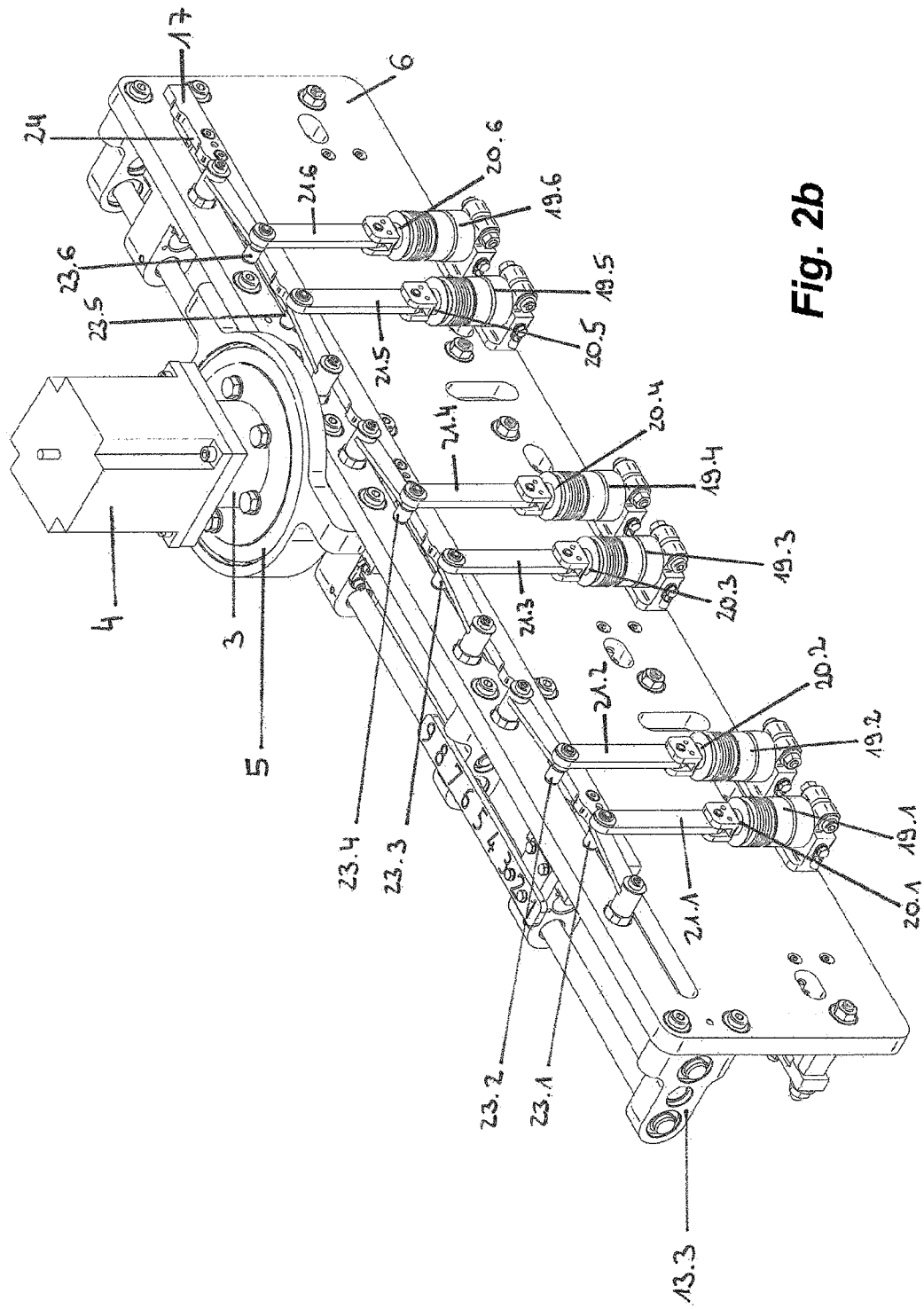
FIG. 2b shows a second side perspective view of the distributing transformer according to FIG. 1, at which the switching means for the uninterrupted load changeover are arranged.

FIGS. 2a and 2b show the step regulating device 1 of the distributing transformer according to the invention in two different perspective side views. Mechanically connected with the transmission module 3 is a support plate 6 of dielectric material, to which the individual subassemblies of the step regulating device 1 are fastenable. The support plate 6 is in that case made from electrically insulating material and constructed for the purpose of receiving all significant components of the step regulating device 1. In that case, FIG. 2a shows the first side of the step regulating device 1, at which the subassemblies of the at least selector contact unit 7.1, 7.2 and 7.3 are fastened to the support plate 6. In the illustration of FIG. 2a there are, for example, three selector contact units 7.1, 7.2 and 7.3; each selector contact unit 7.1, 7.2 and 7.3 is in that case connected with a separate phase, thus winding, of the distributing transformer according to the invention. Each selector contact unit 7.1 . . . 7.3 comprises a respective plurality of connectable fixed selector contacts 8.1 . . . 8.5 that are electrically connected with the winding taps of the regulating winding 44 of the distributing transformer, a contact rail 9 connected with a load diverter LA, and a contact support 10.1 . . . 10.3 with two respective resiliently mounted, movable selector contacts 11.1, 11.2. Regardless of the principle of switching, thus according to the reactor switching principle or resistance fast switching principle, in that case middle settings—in which one movable selector contact, for example the movable selector contact 11.1, is connected with the first fixed selector contact, for example the fixed selector contact 8.1, and the other movable selector contact, for example the movable selector contact 11.2, is connected with the second fixed selector contact, for example the fixed selector contact 8.2, adjacent to the first fixed selector contact—are permissible as stationary operational settings of the on-load tap changer 1. Thus, according to the reactor switching principle nine stationary operational settings are possible with the, here, five illustrated fixed selector contacts 8.1 . . . 8.5, whereas in the case of an on-load tap changer 1 according to the resistance fast switching principle, in which no middle settings are permissible, there are only five stationary operational settings. The contact support 10.1 . . . 10.3 of each phase is then mechanically fixed to a slide carriage 12.1 . . . 12.3 and forms together therewith a constructional unit. The slide carriages 12.1 . . . 12.3 are received at two parallel arranged guide rods 14.1 and 14.2 that are fixed to the support plate 6 by means of a plurality of cross members 13.1 . . . 13.3, in such a manner that the individual fixed selector contacts 8.1 . . . 8.5 are connectable by a longitudinal displacement of the movable contacts 11.1 . . . 11.3 inclusive of slide carriages 12.1 . . . 12.3 along the guide rods 14.1 and 14.2. For this purpose, rotation produced by the motor drive 4 is transmitted by means of the transmission module 3 to a threaded spindle 15 disposed in engagement with a spindle nut 16 that is provided at the middle slide carriage 12.2, so that a longitudinal displacement of the middle slide carriage 12.2 along the guide rods 14.1 and 14.2 can thus be produced. The remaining slide carriages 12.1 and 12.3 are in operative connection with the middle slide carriage 12.2 by way of a similarly longitudinally displaceable guide link 17 that is arranged at the second side of the support plate 6, in that the slide carriages 12.1 and 12.3 are mechanically coupled with the slide carriage 12.2 by way of the guide link 17. A more precise description of this mechanically constrained guidance of the slide carriages 12.1 and 12.3 by means of the slide carriage 12.2 can be inferred from the FIG. description further below with respect to FIG. 3. The plurality of cross members 13.1 . . . 13.3, at which the guide rods 14.1 and 14.2 are retained, additionally forms a mechanical abutment for the movable contacts 10.1 . . . 10.3 that are longitudinally displaceable inclusive of slide carriages 12.1 . . . 12.3, so that the regulating range of the on-load tap changer 1 is thus also mechanically limited.

FIG. 2b in that case shows the second side of the support plate 6 of the step regulating device 1 of the distributing transformer according to the invention, at which the switching means for uninterrupted switching are arranged. In the embodiment of FIG. 2b the switching means for the uninterrupted switching are vacuum interrupters 19.1 . . . 19.6, wherein in each instance two respective vacuum interrupters 19.1 and 19.2 or 19.3 and 19.4 or 19.5 and 19.6 are associated with each phase of the step regulating device 1 and co-operate with a corresponding selector contact unit 7.1 . . . 7.3. The vacuum interrupters 19.1 . . . 19.6 are switching means that are known from the prior art, with a movable switch contact 20.1 . . . 20.6 as well as a fixed contact 18.1 . . . 18.6 that is not illustrated in more detail. Each of the vacuum interrupters 19.1 . . . 19.6 in that regard comprises a movable switch contact 20.1 . . . 20.6 that is arranged at the second side of the support plate 6 to be respectively pivotably connected with a coupling element 21.1 . . . 21.6 and a control lever 22.1 . . . 22.6. Provided at the pivotable connection between the corresponding coupling element 21.1 . . . 21.6 and the control lever 22.1 . . . 22.6 is, on the side facing the support plate 6, a respective rotatably mounted roller 23.1 . . . 23.6 that rolls along the upper side 24 of the guide link 17 under partially maintained contact. The upper side 24 of the guide link 17 has in that case a profiling in the form of lobes so that the vacuum interrupters 19.1 . . . 19.6 can be connected, i.e. opened or closed, by a longitudinal displacement of the guide link 17 in dependence on the profiling of the upper side 24 of the guide link 17.

Figure 3:
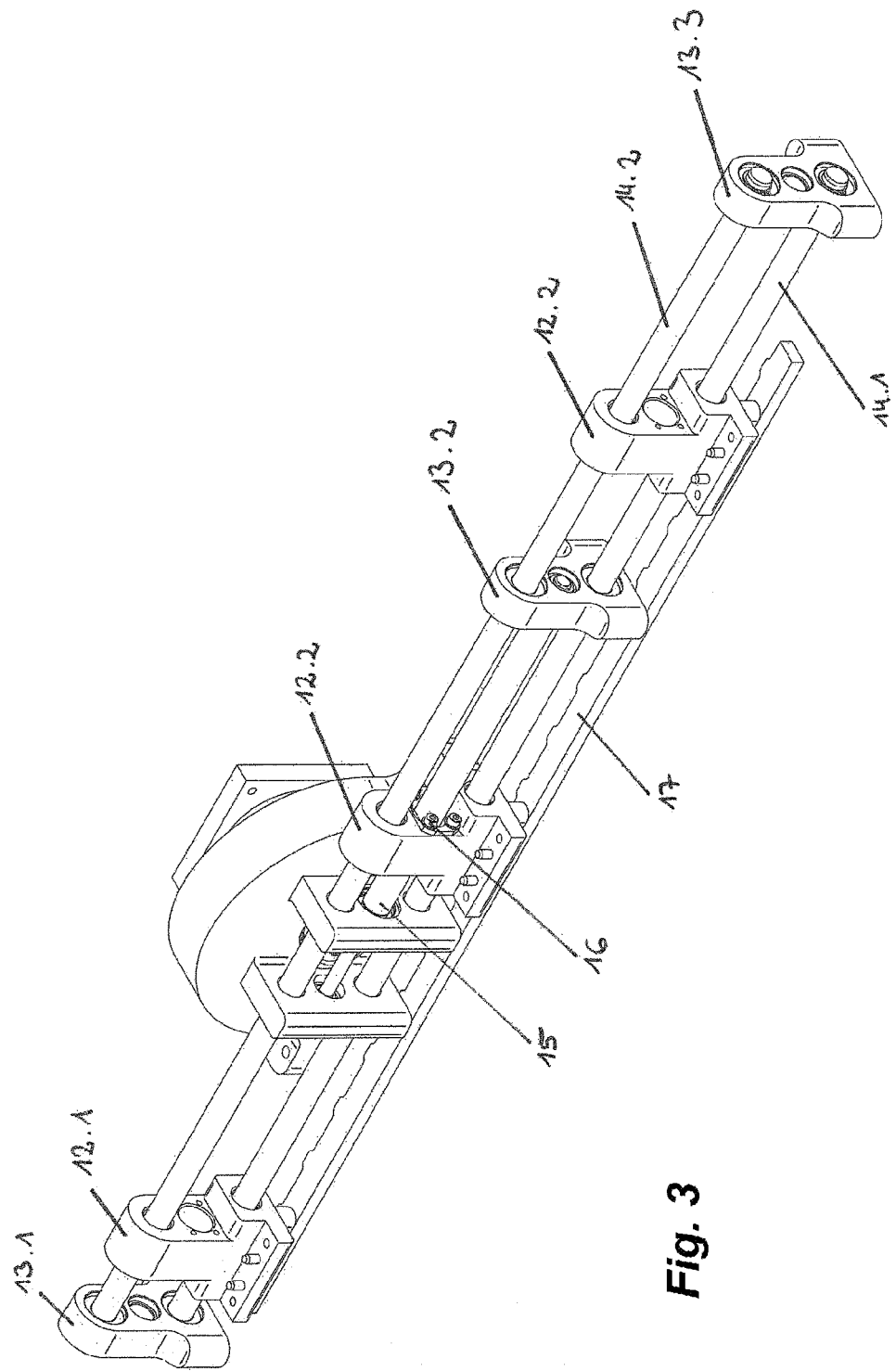
FIG. 3 shows a detail view of the guide rods of a distributing transformer according to the invention.

FIG. 3 shows a simplified detail view of the mechanical coupling of the slide carriages 12.1 . . . 12.3 with the guide link 17. The transmission module 3 is shown that transmits rotation by way of gears (not illustrated here in more detail) to the threaded spindle 15 that in turn passes on the rotation to a spindle nut 16 provided in the middle slide carriage 12.2, so that the rotation of the threaded spindle 15 is converted into a longitudinal movement of the middle slide carriage 12.2 along the guide rods 14.1 and 14.2. Due to the fact that the slide carriages 12.1 . . . 12.3 are mechanically coupled by means of the guide link 17, ultimately through a longitudinal displacement of the middle slide carriage 12.2 along the guide rods 14.1 and 14.2 a longitudinal displacement of the two other side carriages 12.1 and 12.3 is also produced.

Figure 4A:
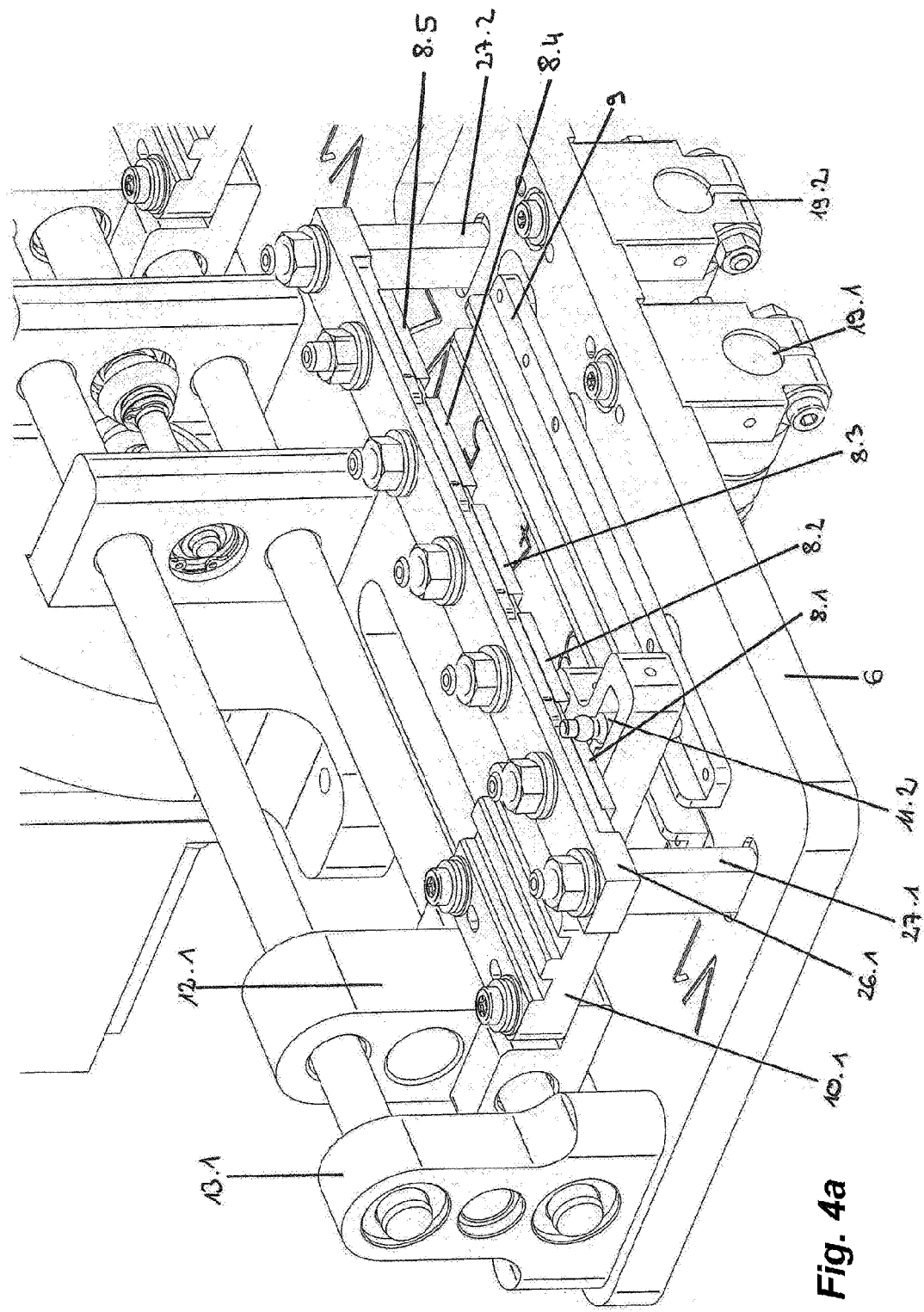
FIG. 4a shows a further detail view of the selector contact unit of a distributing transformer according to the is invention.
Figure 4B:
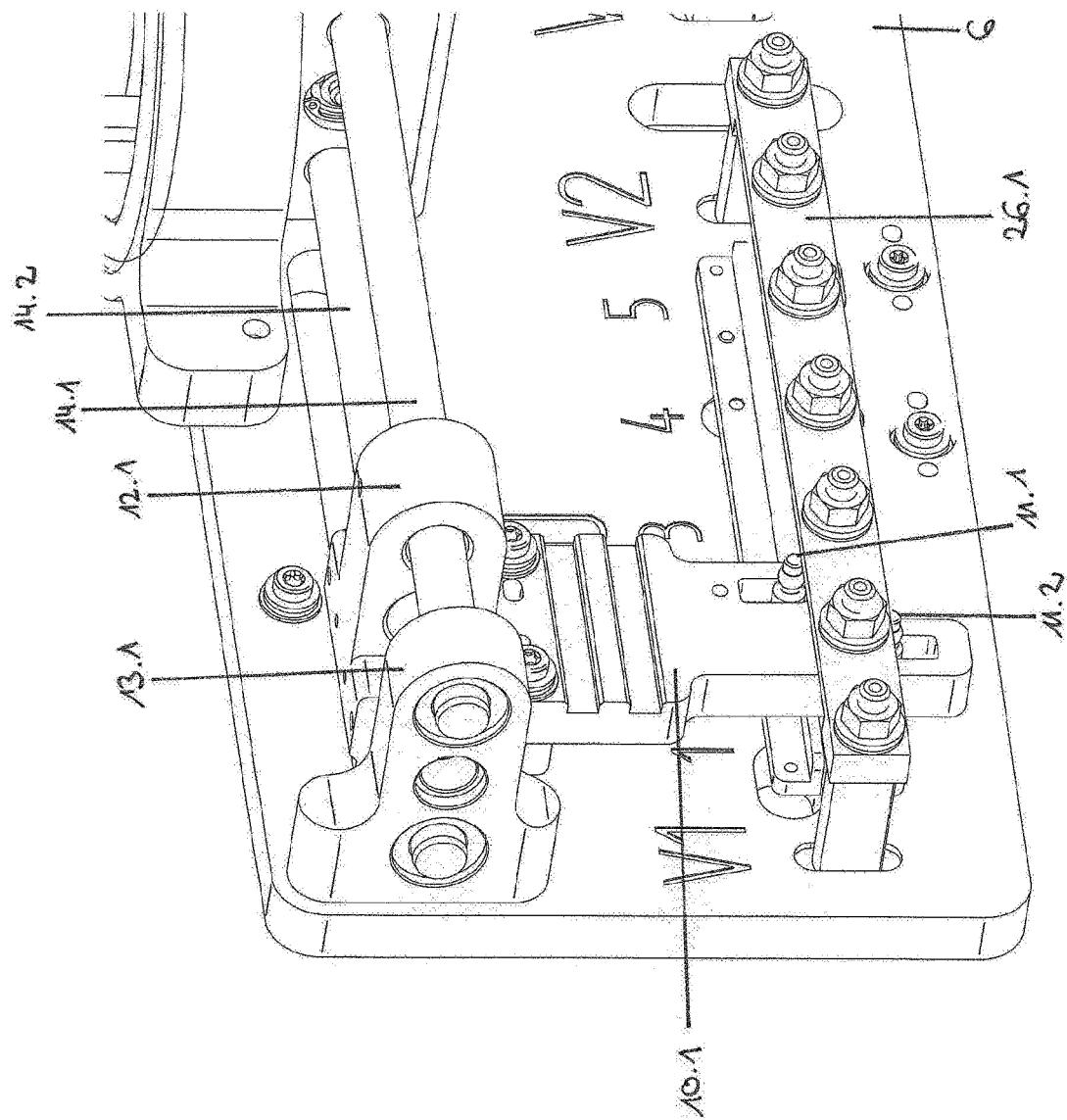
FIG. 4b shows yet a further detail view of the selector contact unit of a distributing transformer according to the invention.

FIGS. 4a and 4b show, in two different perspectives, a further detail view of the selector contact unit 7.1 of a phase of the step regulating device 1 and explain this by way of example; the selector contact units 7.2 and 7.3 are of identical construction. The following explanations therefore also apply to these selector contact units 7.2 and 7.3. The fixed selector contacts 8.1 . . . 8.5 are in that case arranged at a contact strip 25.1 of plastics material, for example by means of a screw connection as illustrated here. The contact strip 25.1 is fastened to the support plate 6 by means of two respective spacers 27.1 and 27.2 that are used as connection of a switch-over choke (not illustrated) or a switch-over resistance. Switch-over chokes are provided in accordance with the reactor switching principle and switch-over resistances according to the resistance fast switching principle. Moreover, the contact strip 25.1 has at the longitudinal side thereof a control link 26.1 at which several lobes 28.1 . . . 28.4 are arranged on both sides in order to vertically move the resiliently mounted selector contacts 11.1 and 11.2 of the corresponding selector contact unit 7.1 in the case of longitudinal displacement of the corresponding slide carriage 12.1, by means of the lobes 28.1 . . . 28.4 provided at the control link 26.1, in dependence on the profile of the plurality of lobes 28.1 . . . 28.4. The profile of the lobes 28.1 . . . 28.4 is in that case dimensioned so that the movable selector contacts 11.1, 11.2 of the selector contact unit 7.1 lift off the currently connected fixed selector contact, here 8.1, between two adjacent fixed selector contacts 8.1 . . . 8.5, since after switching-over is completed they connect again the next fixed selector contact, here 8.2. Whereas a middle setting of the movable selector contacts 11.1 and 11.2 at two adjacent fixed selector contacts 8.1 . . . 8.5 is permissible according to the reactor switching principle, according to the resistance fast switching principle there is onward switching to the next adjacent fixed selector contact. In order to achieve defined contact-making, the contact members 11.1 and 11.2 are formed to be spherical at the actual contact surface.

Figure 5:
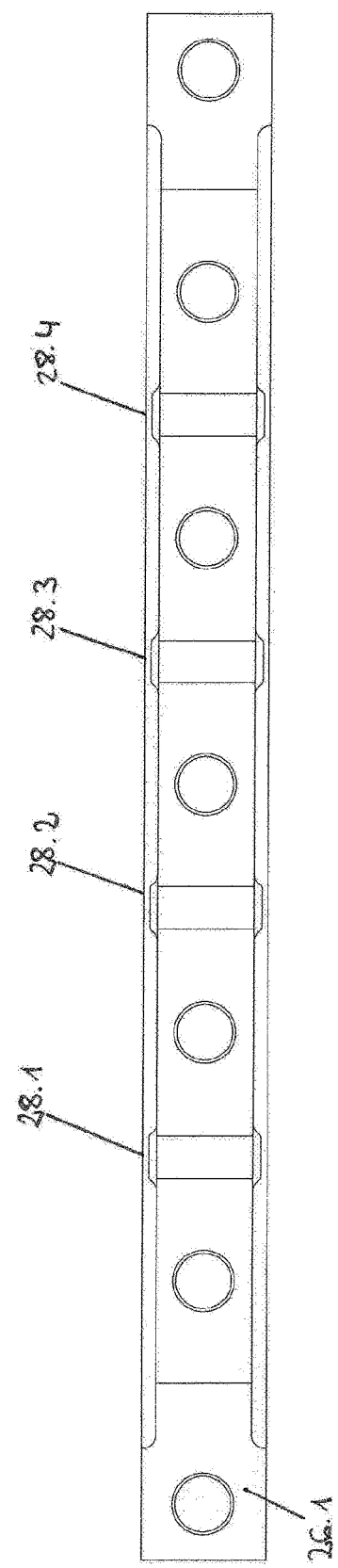
FIG. 5 shows a contact strip of a distributing transformer according to the invention.

FIG. 5 shows the contact strip 25.1 . . . 25.3 with the control link 26.1 . . . 26.3 and the respective plurality of lobes 28.1 . . . 28.4 in a detail illustration, by means of which the corresponding movable selector contacts 11.1 and 11.2 or 11.3 and 11.4 or 11.5 and 11.6 of each selector contact unit 7.1 . . . 7.3 are vertically displaced during a switching-over process depending on the profiling of the lobes 28.1 . . . 28.4.

In the installed state of the step regulating device 1 in the distributing transformer according to the invention the movable switch contacts 20.1 . . . 20.6 of the vacuum interrupters 19.1 . . . 19.6 are electrically connected with the spacers 27.1 . . . 27.2 associated with the respective phase and thus ultimately with the corresponding switch-over chokes or switch-over resistances, whereas the corresponding fixed contacts 18.1 . . . 18.6 of the corresponding vacuum interrupters 19.1 . . . 19.6 are electrically connected with the contact rail 9 of the associated phase. However, in principle, it would also be conceivable to undertake the electrical connecting of the step regulating device 1 in a mode and manner exactly opposite to that just described.

Figure 6A:
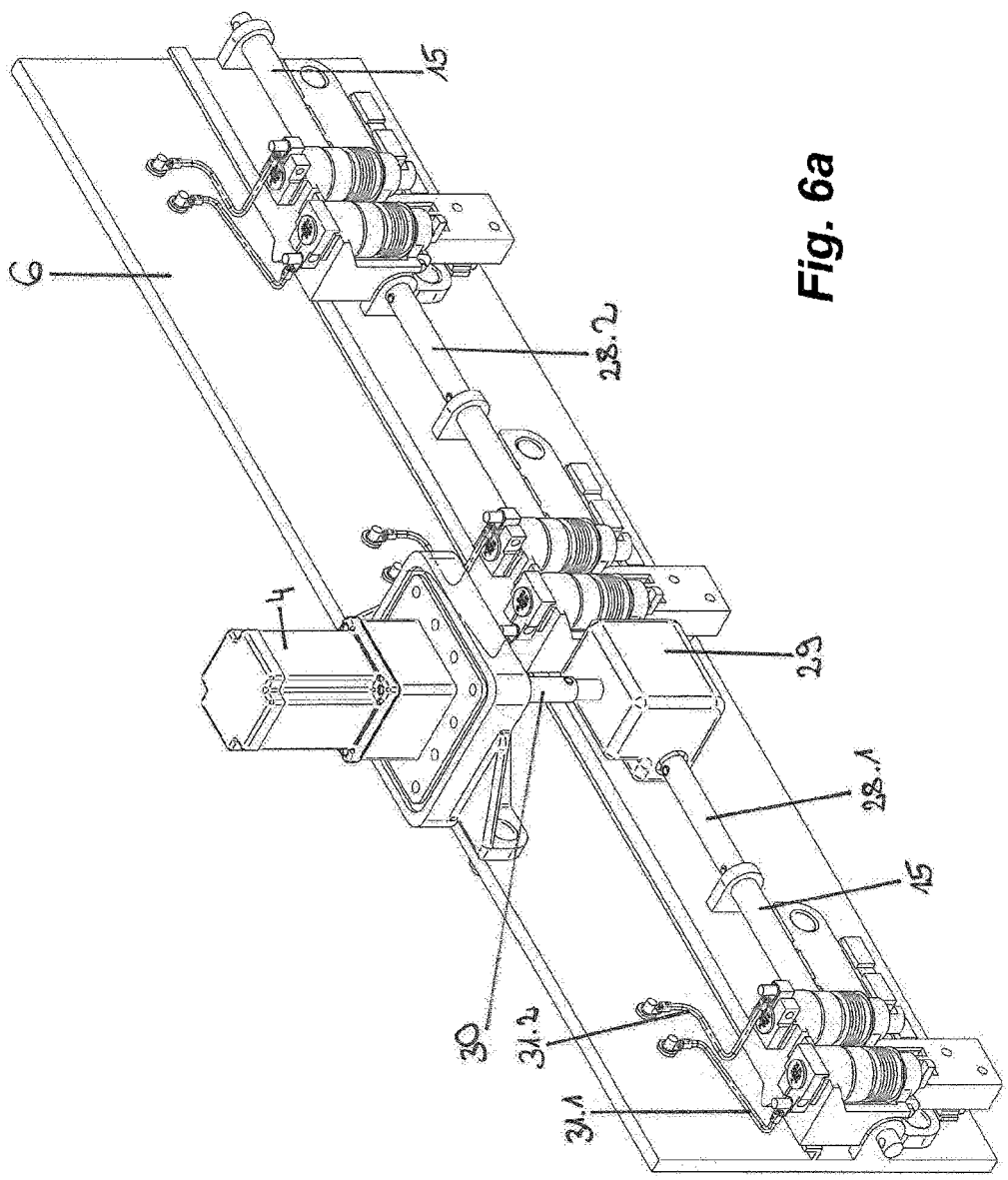
FIG. 6a shows a side perspective view of a further form of embodiment of a distributing transformer according to the invention.
Figure 6B:
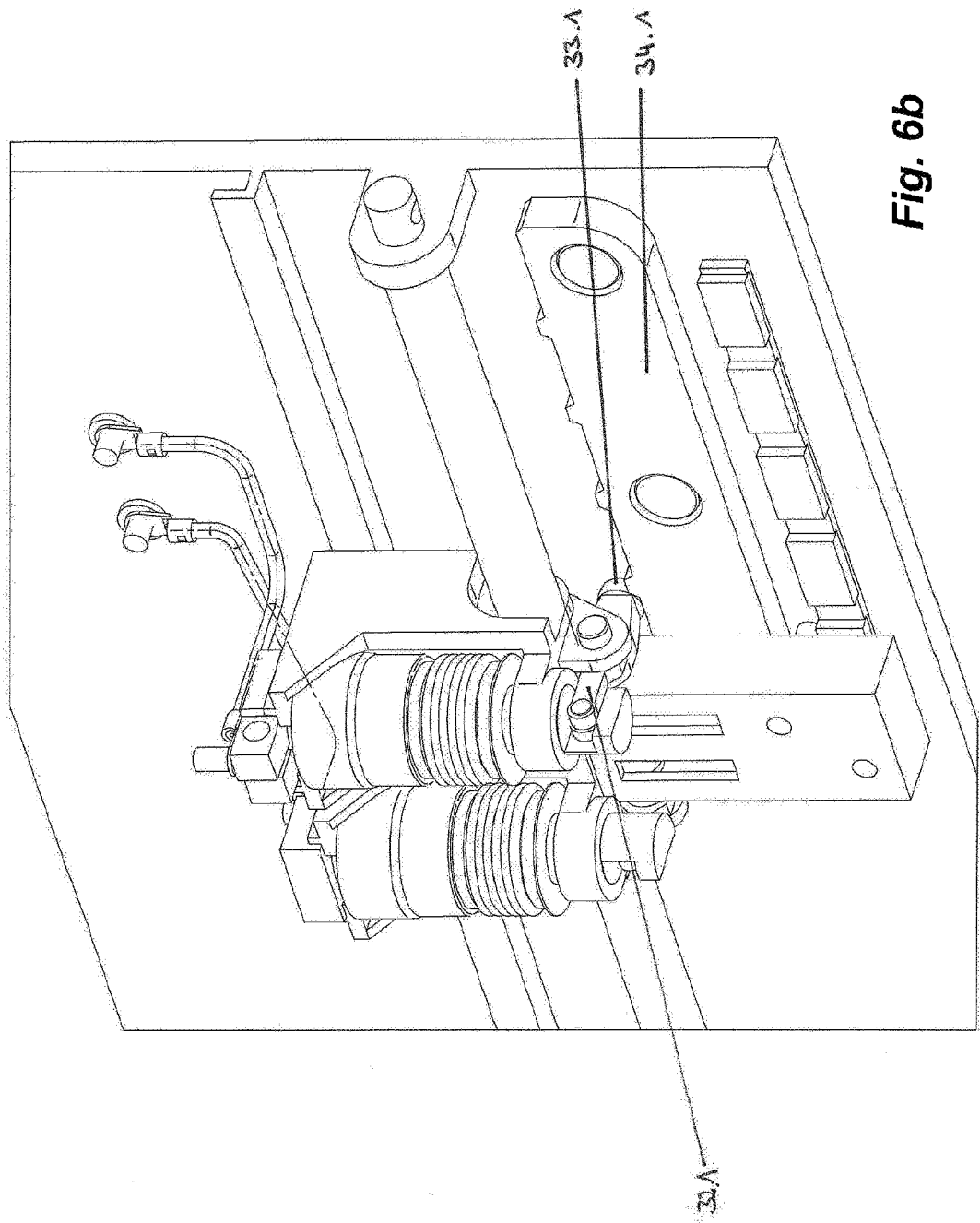

A further form of embodiment of a step regulating device 1 for a distributing transformer according to the invention is shown in FIGS. 6a and 6b. In the description of the figures, explanation is restricted to the differences from the preceding figures, wherein identical components are discussed with the same references numerals as in FIGS. 1 to 5. In this form of embodiment of the step regulating device 1 the switching means for uninterrupted switching, thus the vacuum interrupters 19.1 . . . 19.6, are arranged directly at the corresponding slide carriage 12.1 . . . 12.3 of the respective selector contact unit 7.1 . . . 7.3 and constructed to be movable therewith along the threaded spindle 15. In this form of embodiment each selector contact unit 7.1 . . . 7.3 has its own spindle nut 16—not visible in this illustration—arranged in the corresponding slide carriage 12.1 . . . 12.3, so that the selector contact units 7.1 . . . 7.3 are thus constructed to be synchronously displaceable along the threaded spindle 15. The threaded spindle 15 is composed of a plurality of elements and has in each instance between the corresponding elements a coupling tube 28.1 . . . 28.2 formed from electrically insulating material. In addition, an angle transmission 29 is provided in order to pass on the rotation of the motor drive 3 to the threaded spindle 15. Arranged between the motor drive 3 and the angle transmission 29 is an insulating shaft 30 of dielectric material that introduces the rotation of the motor drive 3 into the angle transmission 29. The fixed contacts 18.1 . . . 18.6 of the vacuum interrupters 19.1 . . . 19.6 arranged at the corresponding slide carriage 12.1 . . . 12.3 are screw-connected with the support plate 6 by means of respective wires 31.1 . . . 31.6 and electrically connected with switch-over chokes or switch-over resistances (not illustrated). The movable switch contacts 20.1 . . . 20.6 of the vacuum interrupters 19.1 . . . 19.6 are in mechanically operative connection with a rocker arm arrangement 32.1 . . . 32.6 having a respective roller 33.1 . . . 33.6. In the installed state of the step regulating device 1 the movable switch contacts 20.1 . . . 20.6 of the vacuum interrupters 19.1 . . . 19.6 are electrically connected with the movable selector contacts 11.1 . . . 11.2 of the associated phase. The corresponding rollers 33.1 . . . 33.6 roll along the profiling of a guide rail 34.1 . . . 34.3 during longitudinal displacement of the slide carriage 12.1 . . . 12.3 so that the respective rocker arm arrangement 32.1 . . . 32.6 thereby connects, i.e. opens or closes, the corresponding movable switch contact 20.1 . . . 20.6 of the associated vacuum interrupter 19.1 . . . 19.6 in dependence on the profiling of the guide rail 34.1 . . . 34.3. The fixed selector contacts 8.1 . . . 8.5, of which only the fixed selector contacts 8.3 . . . 8.5 can be seen in this illustration, are here arranged directly on the support plate 6 and electrically connected on the opposite side (not illustrated here) of the support plate 6 with the corresponding winding taps of the regulating winding of the distributing transformer.

Figure 7A:
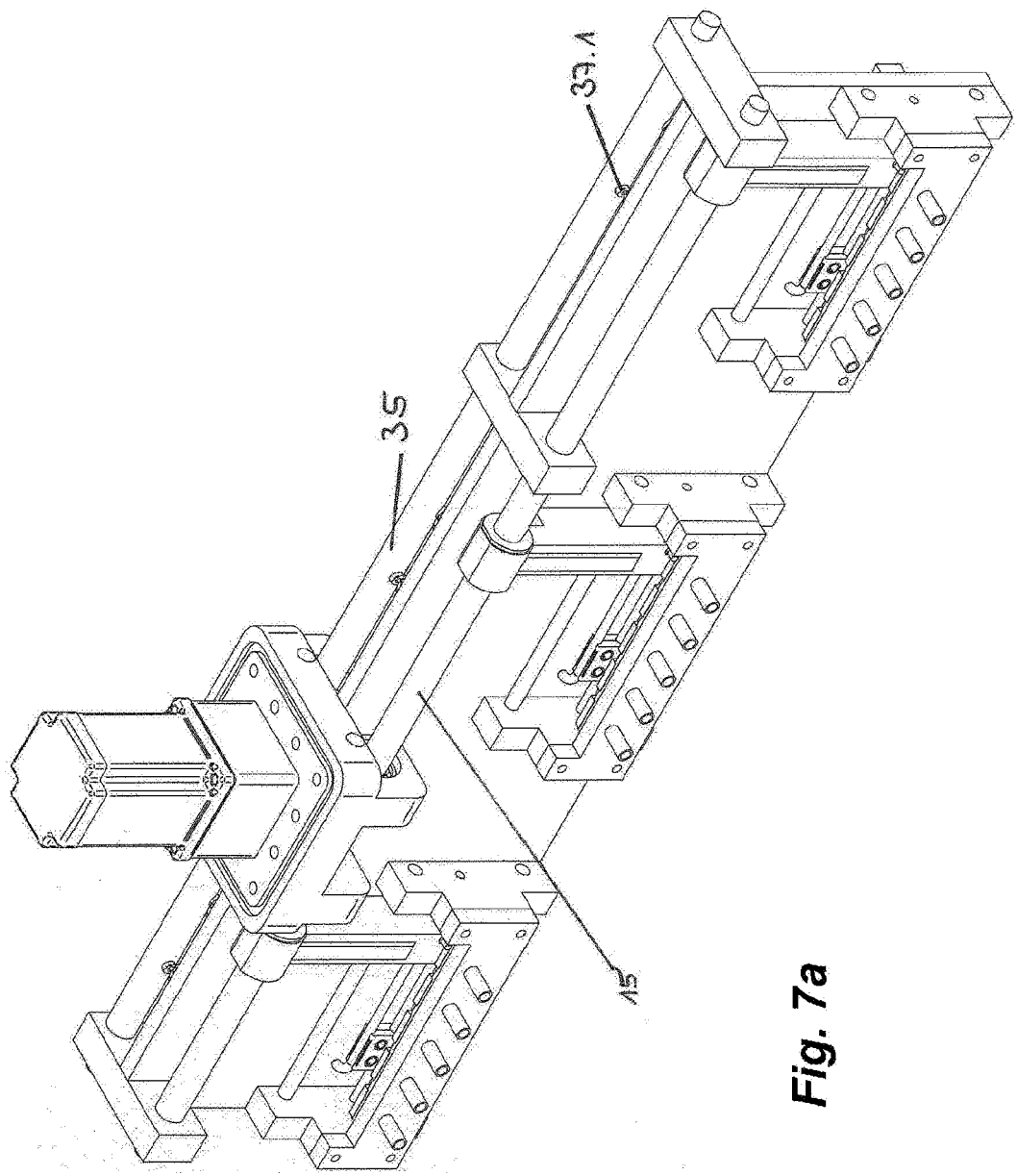
FIG. 7a shows a first side perspective view of yet a further form of embodiment of a distributing transformer according to the invention.
Figure 7B:
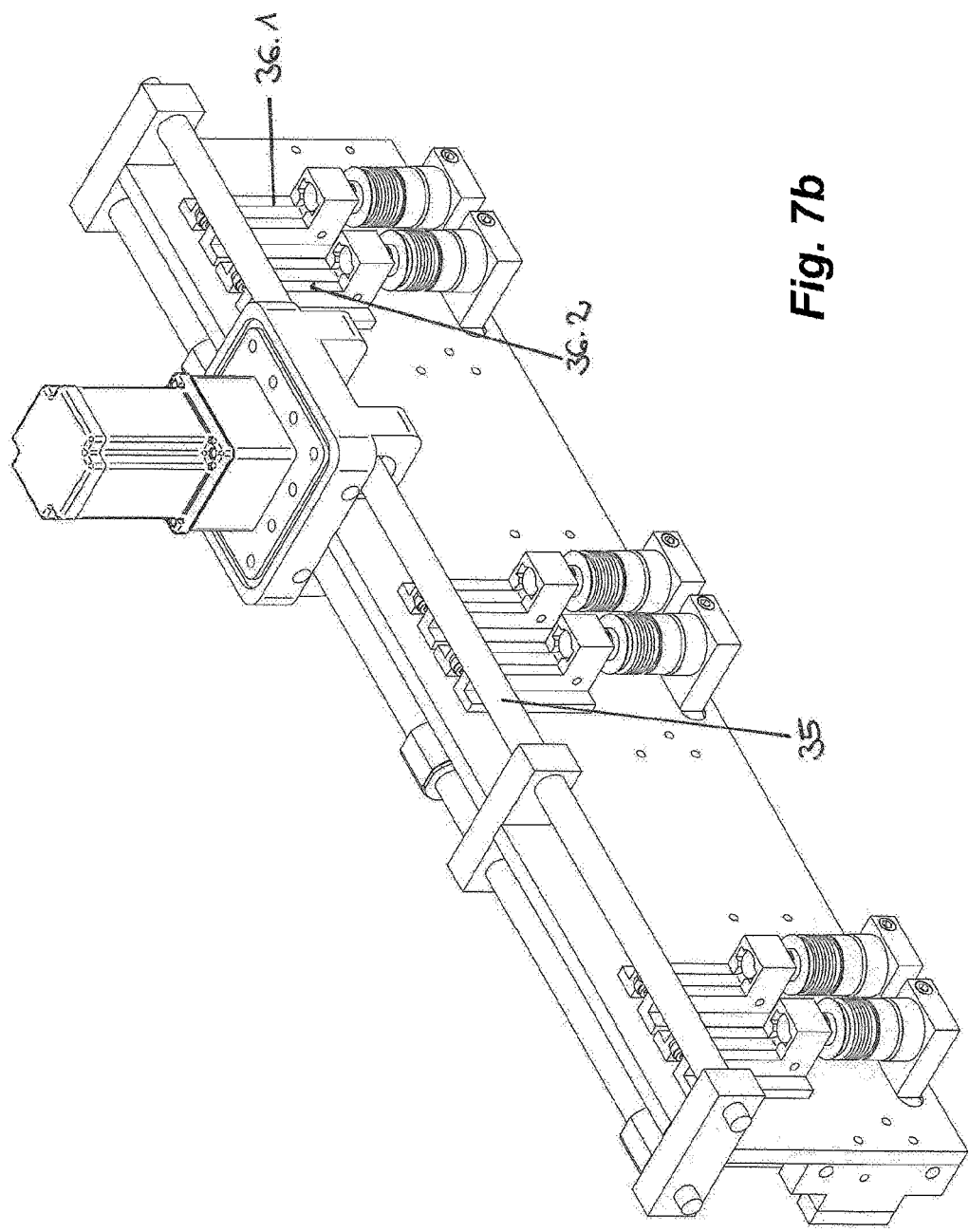

Yet a further form of embodiment of a step regulating device 1 for a distributing transformer is shown in FIGS. 7a and 7b. In the case of the description of these figures, as well, explanation is restricted to the differences from the preceding figures, wherein identical components are discussed with the same reference numerals as in FIGS. 1 to 5. In the form of embodiment of FIGS. 7a and 7b there is driven by the motor drive 3 not only a threaded spindle 15 that is in turn in mechanically operative connection with each of the selector contact units 7.1 . . . 7.3, but also a camshaft 35, by way of which the switching means for uninterrupted switching, thus the vacuum interrupters 19.1 . . . 19.6, are actuatable. By contrast to the illustration of FIGS. 6a and 6b, the threaded spindle 15 is here constructed as a threaded spindle over its entire length and is in engagement with the spindle nut 16 that is provided in each of the slide carriages 12.1 . . . 12.3, in such a manner that each slide carriage 12.1 . . . 12.3 is horizontally moved when rotation of the threaded spindle 15 takes place. The other selector contact unit 7.1 . . . 7.3 is of identical is construction to the selector contact unit 7.1 . . . 7.3 described in FIGS. 1 to 5. For actuation of the vacuum interrupters 19.1 . . . 19.6 each movable switch contact 20.1 . . . 20.6 is mechanically constrainedly coupled with a stroke rod 36.1 ... 36.6 that so co-operates with cam lobes 37.1 ... 37.6 that are opposite the movable switch contacts 20.1 ... 20.6 and arranged on the camshaft 35, that when rotation of the camshaft 35 takes place the cam lobe 37.1 ... 37.6 introduces a vertical movement into the corresponding stroke rod 36.1 ... 36.6 and thus ultimately actuates the associated movable switch contact 20.1 ... 20.6 of the corresponding vacuum interrupter 19.1 ... 19.6. Depending on the switching sequence on which the step regulating device 1 is based a plurality of cam lobes 37.1 ... 37.6 per vacuum interrupter 19.1 ... 19.6 is in that case provided at the circumference of the camshaft 35.

In summary, it can be emphasized that the step regulating device 1 is usable not only in accordance with the reactor switching principle, but also in accordance with the resistance fast switching principle. Depending on the underlying switch-over principle nine stationary operational settings are permissible with the, here, five illustrated fixed selector contacts 8.1 ... 8.5 in accordance with the reactor switching principle, whereas merely five stationary operational settings are permissible with a step regulating device 1 constructed in accordance with the resistance fast switching principle.

REFERENCE NUMERAL LIST 1 tap regulating device
2 transformer cover
3 transmission module
4 motor drive
5 sealing module
6 support plate
7.1 ... 7.3 selector contact unit
8.1 ... 8.5 fixed selector contacts
9 contact rail
10.1 ... 10.3 contact supports
11.1, 11.2 movable selector contacts
12.1 ... 12.3 slide carriages
13.1 ... 13.3 cross members
14.1, 14.2 guide rods
15 threaded spindle
16 spindle nut
17 guide link
18.1 ... 18.6 fixed contacts
19.1 ... 19.6 vacuum interrupters
20.1 ... 20.6 movable switch contacts
21.1 ... 21.6 coupling elements
22.1 ... 22.6 control lever
23.1 ... 23.6 rollers
24 upper-side guide link
25.1 ... 25.3 contact strips
26.1 ... 26.3 control links
27.1, 27.2 spacers
28.1, 28.2 coupling tubes
29 angle transmission
30 insulating shaft
31.1 ... 31.6 wires
32.1 ... 32.6 rocker arm arrangement
33.1 ... 33.6 rollers
34.1 ... 34.3 guide rails
35 camshaft
36.1 ... 36.6 stroke rods
37.1 ... 37.6 cam lobes
40 distributing transformer
41 iron yoke
42.1 ... 42.3 windings
43 main winding
44 regulating winding
45.1 ... 45.5 winding taps

The invention claimed is:

1. A distributing transformer for voltage regulation of local mains, comprising
    a main winding and a regulating winding with a plurality of winding taps,
    a tap regulating device for uninterrupted switching between different winding taps of the distributing transformer, wherein
    at least one selector contact with a respective plurality of fixed selector contacts respectively electrically connected with the individual winding taps is arranged along a line,
    the fixed selector contacts are actuatable by two longitudinally displaceable movable selector contacts,
    for the uninterrupted switching two vacuum interrupters are provided for each phase,
    a motor drive for introducing a drive movement into the tap regulating device is provided, and
    the at least one selector contact unit and the switching means for the uninterrupted switching are so directly actuatable by means of the common motor drive that the introduction of the drive movement of the motor drive into the at least one selector contact unit and the switching means for the uninterrupted switching takes place without interposition of a force-storing device.

2. The distributing transformer according to claim 1, wherein
    rotation generated by the motor drive is transmissible by means of a transmission module to a threaded spindle engaged with a spindle nut provided at a center slide carriage so that a longitudinal displacement of the center slide carriage along guide rods can thereby be produced, and
    the remaining slide carriages are operatively connected with the center slide carriage by way of a similarly longitudinally displaceable guide link that is mechanically coupled with the center slide carriage, so that the remaining slide carriages in turn are so mechanically coupled with the center slide carriage by way of the guide link that not only the selector contact units, but also the switching means for the uninterrupted load switching are thereby simultaneously actuatable.

3. The distributing transformer according to claim 1, wherein the entire step regulating device is arranged by means of a transmission module at the underside of a transformer cover.

4. The distributing transformer according to claim 1, wherein the transmission module comprises a flange-like sealing module.

5. The distributing transformer according to any claim 1, further comprising:
    a support plate of a dielectric material, at the first side of which the at least one selector contact unit and at the second side of which switching means for the uninterrupted switching are arranged, is provided.

6. The distributing transformer according to claim 1, wherein the at least one selector contact unit comprises a respective slide carriage, a respective contact support and respective movable selector contacts that co-operate with at least one fixed selector contact.

7. The distributing transformer according to claim 1, wherein the slide carriage is received by two parallel arranged guide rods that are in turn arranged at the support plate by means of cross members.

8. The distributing transformer according to claim 1, wherein the movable selector contacts are each received in a contact support and co-operate with fixed selector contacts arranged at the support plate.

9. The distributing transformer according to claim 1, wherein the at least one selector contact unit is arranged to be so displaceable along the guide rods by means of the respective slide carriage that it is thereby possible to run through the regulating range of the step regulating device.

10. The distributing transformer according to claim 1, wherein the plurality of cross-members forms a mechanical abutment for the at least one selector contact unit that is displaceable along the guide rods, in such a way that the regulating range of the step regulating device is mechanically limited.

11. The distributing transformer according to claim 1, wherein the movable selector contacts of a phase in each stationary operational setting connect at least one fixed selector contact of the same phase of the step regulating device.

12. The distributing transformer according to claim 1, wherein in each instance two movable selector contacts are received in a contact support to be resiliently mounted.

13. The distributing transformer according to claim 1, wherein
the movable switch contact of the corresponding vacuum interrupter is respectively pivotably and mechanically operatively connected with a coupling element and a control lever, and
provided at the pivotable connection between the corresponding support element and the control lever on the side facing the support plate is a roller that rolls along a profiled upper side of the guide link under partially maintained contact so that the respective vacuum interrupter is connectable by a longitudinal displacement of the guide link in dependence on the profiling of the upper side thereof.

14. The distributing transformer according to claim 1, wherein the fixed selector contacts are arranged at a contact strip, which contact strips are in turn fastened to the support plate by means of respective spacers.

15. The distributing transformer according to claim 1, wherein the contact strip has at its longitudinal side a control link at which several lobes are arranged on both sides.

16. The distributing transformer according to claim 1, wherein the profile of the lobes is so dimensioned that the movable selector contacts of the corresponding selector contact unit between two adjacent fixed selector contacts lift off the currently connected fixed selector contact, since the movable selector contacts again connect the next fixed selector contact after switching has been completed.

17. The distributing transformer according to claim 1, wherein
two respective vacuum interrupters per phase are directly arranged at the corresponding slide carriage of the respective selector contact unit,
the motor drive drives a central threaded spindle by means of an angle transmission,
each slide carriage has a separate spindle nut, and
the threaded spindle co-operates with the spindle nut of each slide carriage and the rotation can be converted into a synchronous longitudinal displacement of the plurality of slide carriages in such a manner that not only the movable selector contacts but also the vacuum interrupters are thereby actuatable.

18. The distributing transformer according to claim 1, wherein the motor drive drives not only a threaded spindle that in turn is operatively connected with the selector contact unit but also a camshaft, by way of which the switching means for the uninterrupted switching are actuatable, in such a manner that both the movable switching contacts and the switching means for the uninterrupted switching are thereby actuatable.

* * * * *